United States Patent [19]

Moore et al.

[11] Patent Number: 4,466,001

[45] Date of Patent: Aug. 14, 1984

[54] POLLING SYSTEM FOR MULTIPLE TERMINAL UNITS

[75] Inventors: Morris A. Moore, North Lauderdale; William V. Braun, Pompano Beach, both of Fla.

[73] Assignee: Motorola, Inc., Schaumburg, Ill.

[21] Appl. No.: 327,310

[22] Filed: Dec. 4, 1981

[51] Int. Cl.³ .............................................. H04Q 9/00
[52] U.S. Cl. .......................... 340/825.08; 340/825.52; 340/825.47
[58] Field of Search ...................... 340/825.08, 825.14, 340/825.47, 825.49, 825.52, 825.03; 375/117

[56] References Cited

U.S. PATENT DOCUMENTS

| | | |
|---|---|---|
| 3,801,956 | 4/1974 | Braun et al. |
| 3,855,576 | 12/1974 | Braun et al. |
| 4,103,286 | 7/1978 | Nicolini et al. |
| 4,151,367 | 4/1979 | Nicolini et al. |
| 4,208,650 | 6/1980 | Horn ................................. 375/117 |
| 4,251,865 | 2/1981 | Moore et al. |
| 4,281,315 | 7/1981 | Bauer et al. .................... 340/825.08 |

OTHER PUBLICATIONS

Patent Application Ser. No. 967,762, filed 12/8/78 by Applicant Bass, Robert H. et al.

Primary Examiner—Donald J. Yusko
Attorney, Agent, or Firm—Margaret Marsh Parker; James W. Gillman; James S. Pristelski

[57] ABSTRACT

A semi-duplex communication system provides high channel efficiency by having the base station transmit a reference signal which each terminal uses as a sync signal. Each unit having data to send to the base responds with a very brief signal such as a burst of silent carrier transmission during an assigned time slot in a queue of slots. Only those units which responded thus are polled during the subsequent polling cycle. During the transmission time slots, the base can be sending acknowledgments to those terminal units having sent messages during the previous polling cycle. While polling for data or acknowledgments or sending acknowledgments, the base can also be listening for the respective responses. The address code of a terminal unit is further encoded to carry other required information in both directions.

5 Claims, 9 Drawing Figures

| INBOUND | | OUTBOUND |
|---|---|---|
| DATA FOLLOWS | W1A, W2A | POLL FOR DATA |
| ACKNOWLEDGE (ACK) | W1A, $\overline{W2A}$ | POLL FOR ACK |
| (AVAILABLE FOR OTHER USES) | $\overline{W1A}$, W2A | DATA FOLLOWS |
| (AVAILABLE FOR OTHER USES) | $\overline{W1A}, \overline{W2A}$ | ACK |

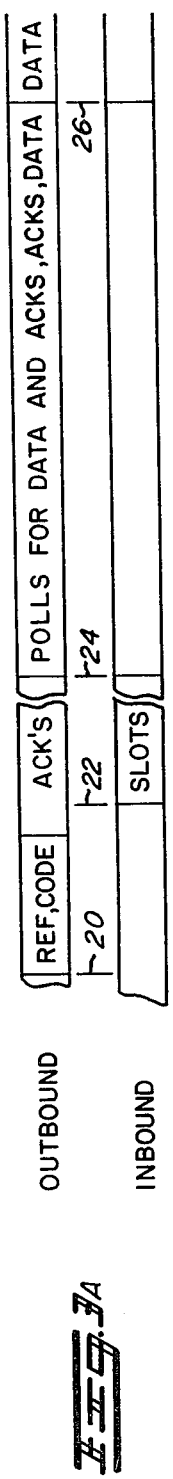
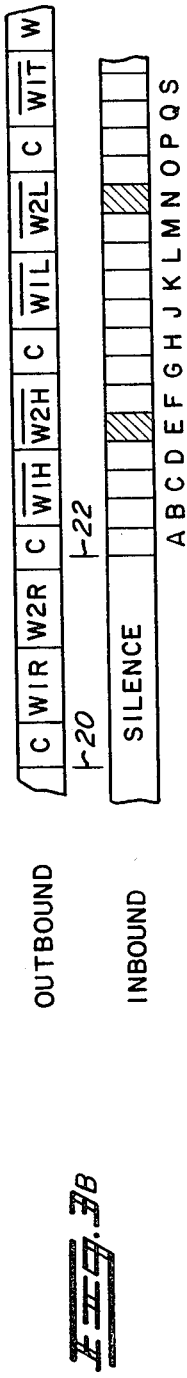
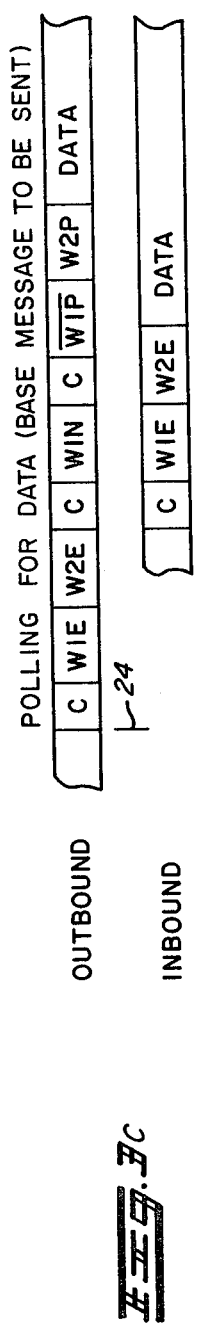
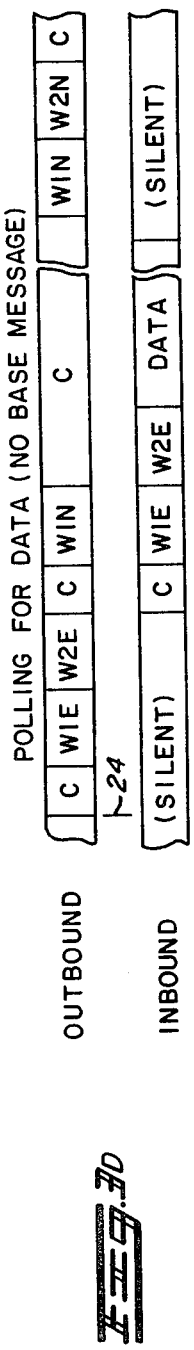

POLLING SYSTEM FOR MULTIPLE TERMINAL UNITS

BACKGROUND OF THE INVENTION

This invention relates to the field of two-way communication between a base station and a number of remote terminal units and, more particularly, to a polling system with increased channel efficiency.

Many types of communications systems are known in which a base station interrogates individual remote stations, the most common method being transmission of one unique address code, followed by a pause in which the base station listens for the addressed unit to respond, then transmitting a second unique address code, pausing, etc. In U.S. Pat. No. 4,251,865 issued Feb. 17, 1981, having the same assignee as the present invention, a polling arrangement was disclosed having two features. First, only those terminal units tagged as "active" are regularly polled. In this context, active is defined as presently transmitting data or processing data, or having done either within a brief preceding period of time; e.g., the previous five minutes. "Inactive" units are also polled, but at much less frequent intervals, and only a few during each polling cycle. Even in this system, many address codes are transmitted which are not responded to.

As to the second feature of the copending application, each remote terminal having data to transmit would immediately respond with the address code of the base station. When the base station received and detected its address code, it immediately aborted the address code it was transmitting at that time and waited until the responding unit's message was complete before resuming the polling sequence with the aborted code. The responding unit was identified by the address code immediately preceding the aborted code. Neither base nor terminals used duplex operation.

SUMMARY OF THE INVENTION

It is an object, therefore, of the present invention to provide a means of polling a number of remote terminal units with maximum channel efficiency.

This object and others are provided in a polling system in accordance with the present invention wherein a base station transmits a group address code as a reference signal. Each terminal detects that code and sets its internal timer to enable transmission during a time slot which is determined by a queue of slots. If a terminal has data to transmit, a very brief transmission is sent during the respective time slot. The base lists all units having responded and, in the following period, polls each of them in turn. The system also includes the capability of base quasi-duplex operation, in that the base can, in some portions of its operation, be receiving and transmitting at the same time.

BRIEF DESCRIPTION OF THE DRAWING

FIG. 3A is a diagram showing the general plan of transmitted signals in both channels.

FIG. 3B is an expansion of one portion of the diagram of FIG. 3A.

FIG. 3C is an expansion of another portion of FIG. 3A.

FIG. 3D is an expansion of the same portion as in FIG. 3C, under different conditions.

DETAILED DESCRIPTION OF A PREFERRED EMBODIMENT

Figures 1, 2:
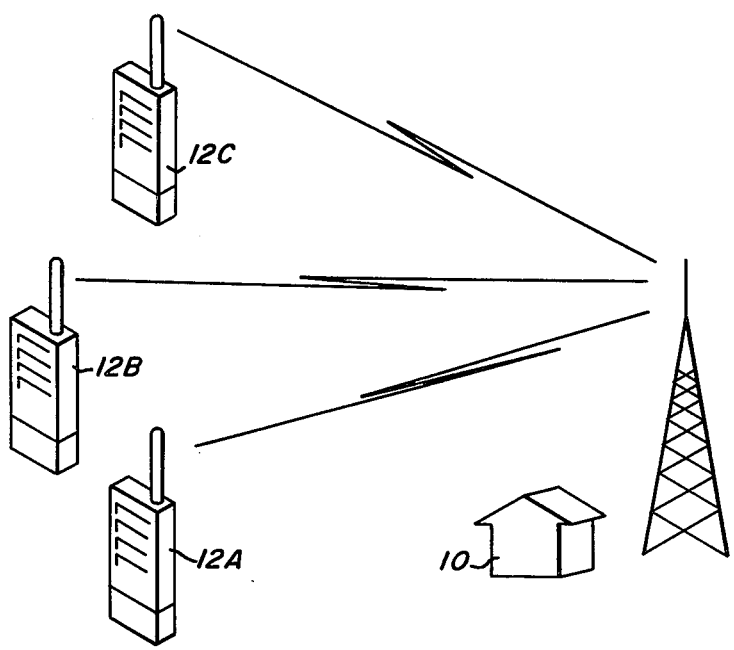
FIG. 1 is a diagram of a system such as might utilize the present invention.
FIG. 2 is a chart of encoded address codes for the system.

In FIG. 1, a base station 10 is shown with a number of remote terminal units 12. The terminal units may be coupled to the base station by wire or radio and include some means of data entry such as a keyboard. The system could also include a second transmission link to a large computer (not shown). Such a system is described in the above-referenced copending application and in another copending application, Ser. No. 967,805, also assigned to the same assignee. The second link forms no part of the present invention except that the data being transmitted here may also be stored at the base station and reformatted for the computer and the reverse for return data. the present polling system is preferably used with the address detection system as disclosed in U.S. Pat. Nos. 3,801,956 and 3,855,576, which are included herein by reference. Briefly, binary information in a received bit stream is sampled and stored in a shift register. A code plug in the receiving unit outputs to a second shift register the binary bits corresponding to the first word of the two word address code of the unit. The bits are compared, a pair at a time, by running the bits in the first register past each bit in the second register and counting correlations. If the number of correlations is greater than a given number, a match is indicated. Likewise, if the number of correlations is less than another, and much smaller, given number, the inverse of the address code word is indicated. The second address word is detected in the same fashion. Thus, the four variations of the address words and their inverses can be detected, with a different detect signal provided for each.

FIG. 2 is a chart of the encoded address codes and their meanings, for both inbound (terminal-to-base) and outbound channels. The address code for a unit "A" is used as an example here, unit "B" being represented hereinafter as W1B, W2B for "word one B" and "word two B". An actual code as used in the above-referenced patents would consist of two 23-bit words spaced by one and one half bits. In practice, address codes are separated by commas, a "comma" being a block of non-data signal as, for example, a series of 1/0 at the same or double bit rate.

The signal diagrams of FIG. 3 are not drawn to any scale. FIG. 3A is a diagram showing the general plan of both inbound and outbound signals. It should be kept in mind that, while the base station 10 may be able to transmit and receive simultaneously, the terminal units 12 cannot, typically switching with a push-to-talk switch. Beginning at point 20, with the base transmitter warmed up, the base will transmit a group or reference address code W1R, W2R. Each terminal unit will be able to detect both the group or reference address code and its own unique address code, but not simultaneously. In the address word detection as described above, the received bits would be compared alternately with one and then the other of the stored codes, with detect signals being channeled in different signal paths. Each unit will receive the reference code and will set an internal timer to enable transmission during an assigned time slot in a permanent queue or series of slots. Alternately, the units may be enabled to listen or detect the reference signal only when they have the data to send. In the latter case, it is remotely possible that a unit might be activated to transmit immediately after the reference signal was transmitted and thus would not be enabled at its time slot. Such a coincidence is highly unlikely to occur.

Usually, each time slot will be assigned to only one terminal unit, but in certain system configurations, more than one unit could be assigned to a slot. The effect of multiple slot assignment will be discussed with respect to FIG. 3C. If a given terminal has data to transmit, it will send a brief signal during its assigned time slot. The signal could take many forms, preferably a burst of silent carrier with a duration of perhaps one eighth the duration of an address code plus a comma. Since each terminal responds in an assigned time slot, the base needs only to hear activity in the channel during a given time slot in order to know (or assume) that the unit assigned to that time slot has data to transmit. A form of fail-safe operation is achieved, therefore, since any activity on the channel, even a false signal, will enable the unit to transmit.

During the series of time slots, the base 10 can be transmitting acknowledgments or ACK's ($\overline{W1A}$, $\overline{W2A}$) to units which have sent in data on the previous polling cycle, an ACK signifying that the data was correctly received. At the end of the time slots, the base 10 has a record of all terminal units 12 having stored data to transmit. In the next period, beginning at a point 24 and ending at a point 26, the base 10 will send out, as appropriate, a series of POLLS FOR DATA (W1A, W2A), ACK's, and POLLS FOR ACK's (W1A, $\overline{W2A}$), generally in the queue sequence, although this is not necessary and there may be exceptions as will be seen with respect to FIG. 3C. DATA FOLLOWS (OVE/W1A/, W2A plus data) may also be sent during this period. POLLS FOR DATA will be sent to units having responded during the respective time slots. ACK's, as noted above, are sent to units having transmitted data during the previous polling cycle, and POLLS FOR ACK's are sent to units which received data during the previous cycle. During the period 24–26, some of the terminal units will be responding to polls and some will be receiving messages from the base or ACK's for messages previously sent to the base. After point 26, all polling is complete, the terminals are silent, but the base will transmit any remaining stored messages to terminals. Then the cycle repeats from point 20.

FIG. 3B is an expansion of the first portion of the diagram of FIG. 3A, wherein the base sends first the reference code (W1R, W2R), then begins to send ACK's, which, in the illustrated example, are sent to units H, L and T, which are here presumed to have sent data on the previous cycle. The ACK message tells a terminal that its message was correctly received, that the terminal memory can be cleared of the message, and that the keyboard can now be used to enter a new message. In the inbound channel, following the point 22, units E and N are indicated as transmitting in their respective time slots.

FIG. 3C is an expansion of a portion of FIG. A beginning at point 24 and shows a POLL FOR DATA (W1E, W2E) sent to the first unit (E) having responded in the time slots. At the end of the poll, with allowance for circuit delays, the unit E begins to respond by transmitting back DATA FOLLOWS (W1E, W2E) which indicates to the base that a data message is coming and also identifies the sending unit. Detection of the multiplicity of address codes is simplified in the base station, as opposed to the terminal unit detector, since the base can route the address code from the permanent list in memory to the second shift register (as described with respect to FIG. 1) immediately after the address transmission. Thus, although the base has already begun to transmit the next POLL FOR DATA (W1N, W2N), so as not to waste time in case unit E does not respond, as soon as the first word W1E is detected by the base, the unit N poll is aborted. The unit N poll is not completed since a response from unit N would, in all likelihood, interfere with the unit E response. However, since a data message for unit P is assumed to be the first message stored in the base memory, a DATA FOLLOWS code ($\overline{W1P}$, W2P) is transmitted outbound, followed by the data. In this example, the W1N, W2N code would not be begun again until the E and P messages are completed. As referred to hereinabove, in some embodiments of the system, a time slot might be assigned to two terminal units. If, as shown in FIG. 3B, there was activity in the E time slot which might have been assigned to units E and EE, for example, the first POLL FOR DATA would be as given in this paragraph, and the next would be W1EE, W2EE. Thus, with no confusion and at most an unnecessary poll, the units E and EE have a chance to communicate with the base.

FIG. 3D is similar to FIG. 3C, but under the condition that no data messages were stored in the base memory when the unit N code poll was aborted. Thus, when the DATA FOLLOWS code is detected by the base and the unit N poll is aborted, the base transmits comma until the unit E message is completed. The base would then resume with the aborted address.

Figures 3E, 4B:
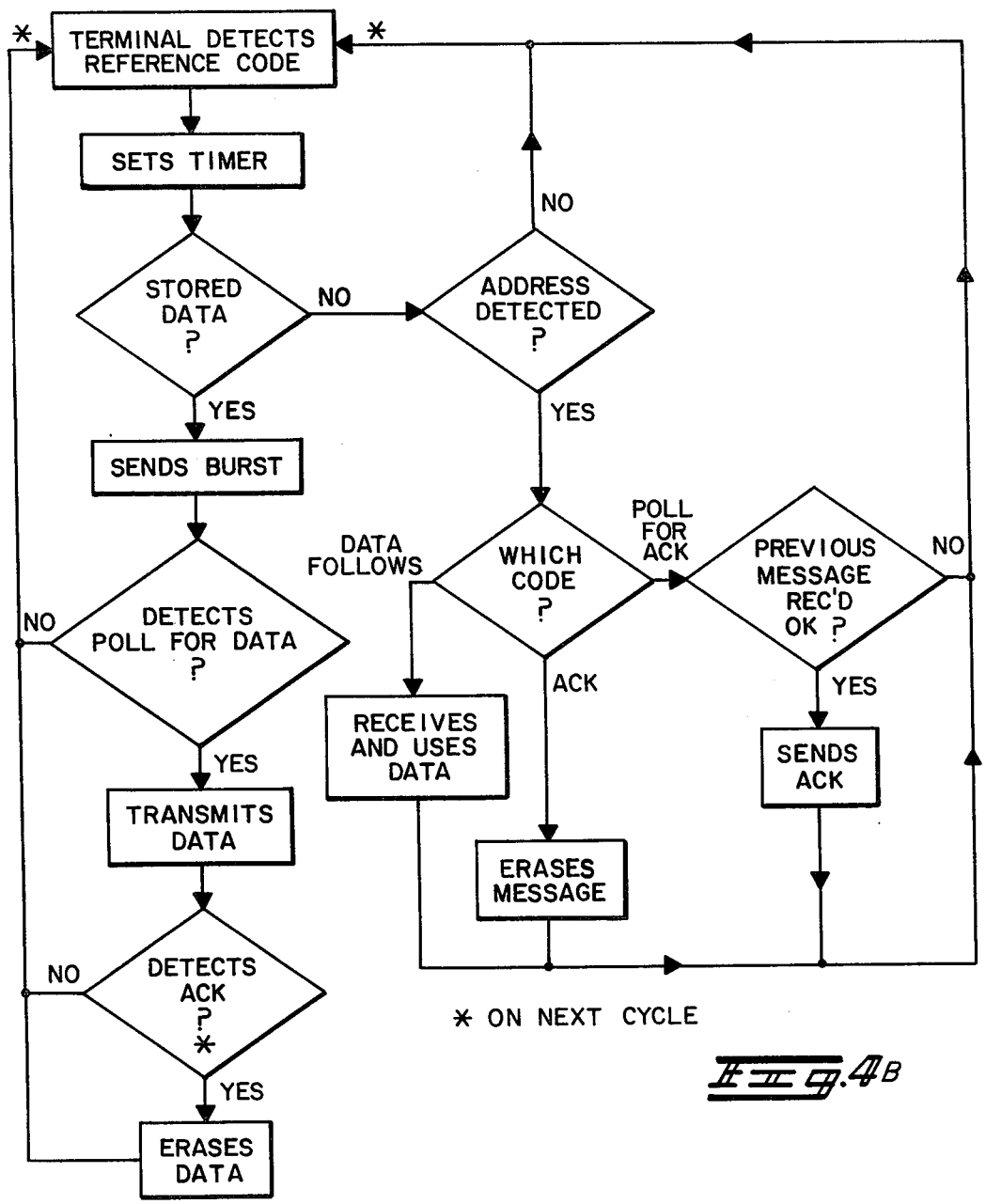
FIG. 3E is a diagram of another portion of FIG. 3A.
FIG. 4B is a flow chart of the terminal unit operation.

FIG. 3E is also a portion of FIG. 3A, but assumes that units, T, U have received data on the previous cycle. Thus, as the polling sequence progresses, the base would eventually transmit to units T, U the corresponding POLLS FOR ACK (W1T, $\overline{W2T}$) and (W1U, $\overline{W2U}$). When unit T detects its respective code, an ACK (W1T, $\overline{W2T}$) is transmitted back to the base. Since the expected inbound response will be of the same length as the next outbound code, the polling sequence is not interrupted. In regard to acknowledgments, it should be pointed out that if an expected ACK is not received, the message previously transmitted will not be erased, but will be retransmitted on the next cycle. This cycle would be repeated as necessary for a limited number of times; e.g. four times, then the message would be erased to make the channel available for new messages.

The outbound transmission after point 26 will consist of any remaining stored data messages which could not be fitted into the polling sequence as was the data message sent to unit P in FIG. 3C. This portion will, therefore, be an unbroken series of DATA FOLLOWS codes (W1x, W2x) each followed by the respective data message.

Figure 4A:
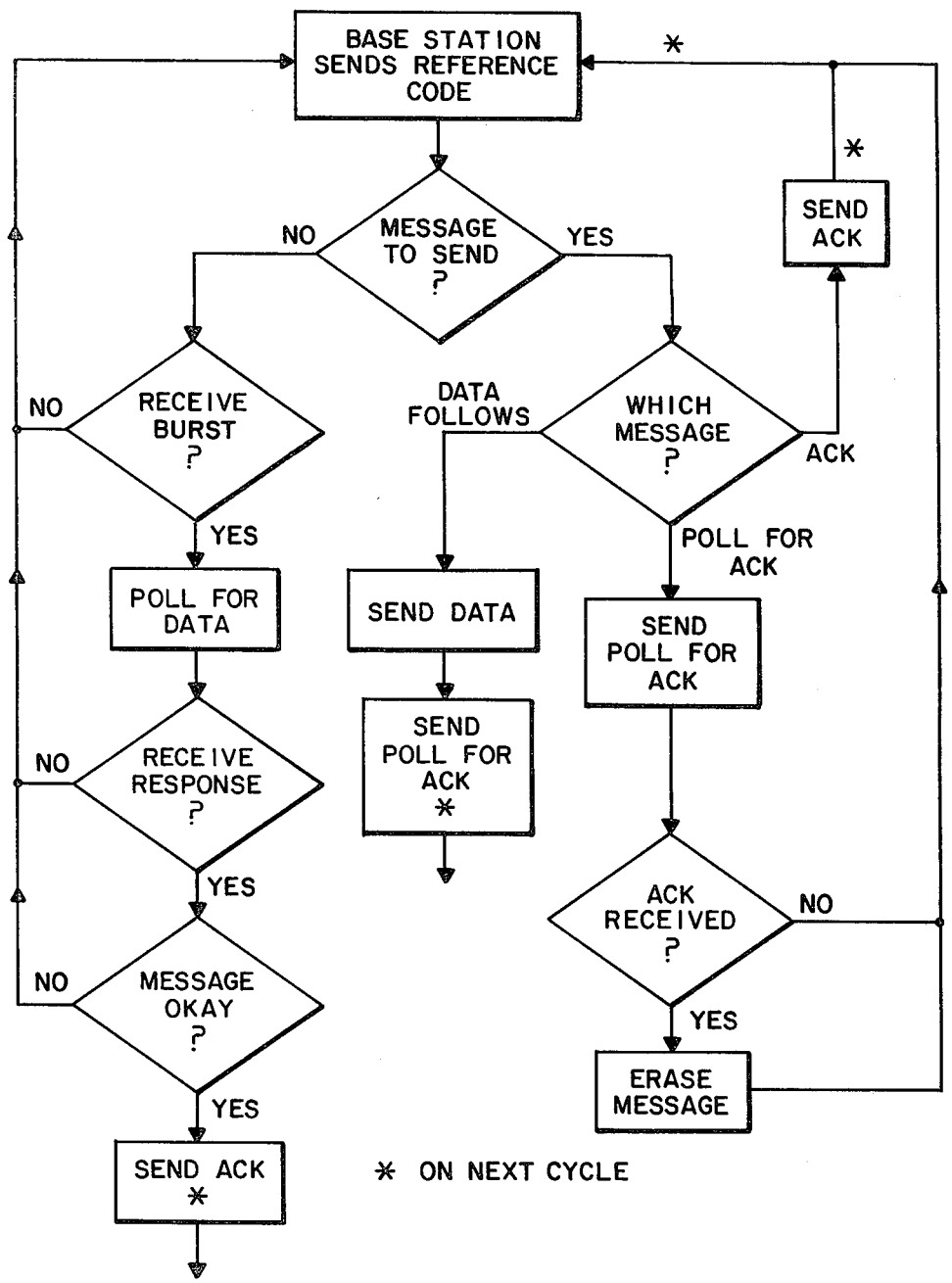
FIG. 4A is a flow chart of the base station operation.

FIG. 4A is a flow chart showing the base station 10 operation as related to one terminal unit A. To initiate operation, the base sends out the reference code which can be detected by all terminal units 12. The first decision box does not indicate that the base would not "listen" to the unit. Implicit in the decision "message to send" is the fact that if the given terminal has previously sent in data for which a response is being made, that unit cannot send a burst during its assigned time slot. If no response is stored in the base memory for a given unit, a burst could be forthcoming in the time slot. If no burst is received, the unit is merely ignored until the next cycle. If a burst is received, the unit is POLLED FOR DATA (W1A, W2A) in the polling portion of the cycle. If no data is received; e.g., if the burst had been a false signal, the unit will, again, be ignored. If a message was received and is correct, the base would process the data in any fashion appropriate to the entire system and, in the next cycle, send an ACK to that unit.

If the base had had a message to send, the message could have been an ACK, POLL FOR ACK OR DATA FOLLOWS. If an ACK ($\overline{W1A}$, $\overline{W2A}$), the code is sent, either in the period 22–24 during the time slots, or in the period 24–26. If the message is DATA FOLLOWS, it is sent during the period 24–26 or after 26, and is in the form $\overline{W1A}$, W2A plus data. On the next cycle, the terminal unit would send POLL FOR ACK (W1A, $\overline{W2A}$). If ACK (W1A, $\overline{W2A}$) is then received from the unit, the base will erase the data from memory.

FIG. 4B is a flow chart of the operation of the terminal unit A beginning with detection of the reference code W1R, W2R. The terminal unit may be adapted to detect the reference code each time it is transmitted, or only when the unit has a message to send to the base. Alternatively, the unit timing circuit may be enabled only when a message is to be sent. In any case, if a message is to be sent, a timing reference will be taken from the reference code detection. The terminal will time on at the assigned time slot and transmit a brief signal to tell the base that a message will be forthcoming. It is to be noted that the brief burst signal is the only transmission ever made by a terminal unit which is not in response to a poll. Therefore, following the burst, the terminal remains silent until it detects a POLL FOR DATA (W1A, W2A). The unit transmits back a DATA FOLLOWS (W1A, W2A) followed by the data message. The unit then waits for an ACK on the subsequent cycle, and if ACK is received, erases the message. If a response is required from the base or a host computer, the unit then waits for the response, and no more data can be entered at the unit keyboard. If ACK is not received in the next cycle, the unit sends a burst on the following cycle and repeats the message.

If unit A did not have a message to transmit, it is possible that the base has a message for the unit. In this case, the next action would be detection of the unit address code in one of three encodings. If the code is ACK, the unit erases the message previously sent to base and is available for a new message to be entered via the keyboard. If the code is POLL FOR ACK and the previous message from base had been satisfactory, the unit will transmit an ACK. If the code is DATA FOLLOWS, the unit records the message for whatever use is appropriate.

Thus, there has been shown and described a means for providing increased efficiency in a system having a base station and requiring that a number of terminal units be polled for information using only one outbound channel and one inbound channel. The use of assigned time slots means that no unnecessary polls are transmitted and, even during the time slots, messages can be transmitted to those units which could not be responding in the slots. There are many possible modifications and variations of the present invention and it is intended to cover all such as fall within the spirit and scope of the appended claims.

What is claimed is:

1. A polling method for a two-way communication system having a base station and a multiplicity of terminal units, each unit having a unique address code and the capability of detecting the respective address code and a reference address code, each terminal unit including an internal timer, and comprising the steps of:
   establishing a permanent queue of assigned time slots for terminal responses;
   transmitting the reference address code base-to-terminal, with the time slot sequence following closely upon the reference code;
   each terminal detecting the reference address code and, in response thereto, setting the respective timer to enable terminal transmission in the respective assigned time slot;
   each terminal having stored data to transmit to the base station transmitting a responsive signal in the respective assigned time slot;
   the base station keeping a record of terminals responding in the time slots;
   subsequent to the time slots, the base station transmitting in sequence the respective address codes of those terminals responding in the time slots; and
   each terminal, upon detecting the respective address code, transmitting said address code followed by the stored data.

2. A polling method in accordance with claim 1 wherein each address code is a two word binary code, and each unit has the capability of detecting both words of the address code and the inverse of each word, and being able to distinguish among the four combinations thereof.

3. A polling method in accordance with claim 2 and further including the steps of the base station further encoding the respective address code of each terminal in the record of terminals in accordance with the message status for each terminal, and the terminal units further encoding the respective address code in accordance with the message status of the terminal, the encoded address codes consisting of combinations of the words of the address code and the inversions thereof.

4. A polling method in accordance with claim 3 wherein the step of record keeping includes recording which terminals have been sent data in a previous polling cycle, terminals to which data is waiting to be sent, and terminals from which usable data was received in a previous polling cycle.

5. A polling method in accordance with claim 1 and further including a step wherein, during the period for time slot transmissions, the base station transmits the encoded respective address code of at least some of the terminals from which usable data was received in a previous polling cycle.

* * * * *